Jan. 12, 1932.  H. H. GLASIER  1,840,501
SWINGING DRAWBAR
Filed Feb. 3, 1931  2 Sheets-Sheet 1

INVENTOR
Harold H. Glasier
BY
Westall and Wallace
ATTORNEYS

Jan. 12, 1932.  H. H. GLASIER  1,840,501
SWINGING DRAWBAR
Filed Feb. 3, 1931   2 Sheets-Sheet 2

INVENTOR
Harold H. Glasier
BY
Westall and Wallace
ATTORNEYS

Patented Jan. 12, 1932

1,840,501

UNITED STATES PATENT OFFICE

HAROLD H. GLASIER, OF LOS ANGELES, CALIFORNIA

SWINGING DRAWBAR

Application filed February 3, 1931. Serial No. 513,066.

This invention relates to a vehicle type of implement having a traction unit and a trailer unit coupled thereto wherein the angular position of the trailer unit may be controlled. It is especially adapted for four wheel close coupled types. The invention has a particular field of utility in self propelled agricultural implements for working small plots of ground although not limited to such use. It is desirable to have such implements short and compact. In such implements employing a drawbar which is coupled to the front of the tractor frame for free swinging, the drawbar swings too readily being influenced by stones and hard spots with the result that the tools follow a wobbly course. To overcome this, handles have been mounted on the drawbar structure. This last mentioned means is inconvenient and awkward for controlling the path of the tools as the operator must also attend to the tractor handles, and it also involves a physical strain on the operator. The present invention has for its objects the provision of a drawbar frame which may be swingably connected to the tractor frame near the front axle, will enable the use of four close coupled wheels and has a stabilizing control mechanism to determine the angular positions of the frames.

An embodiment of my invention is illustrated in the accompanying drawings, in which:—

Figure 1:
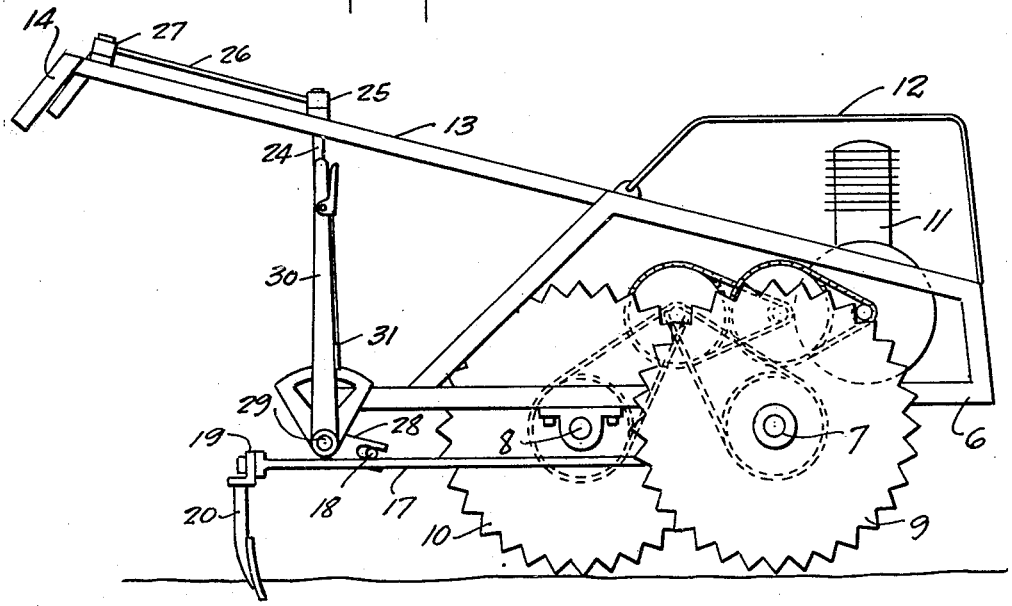
Figure 2:
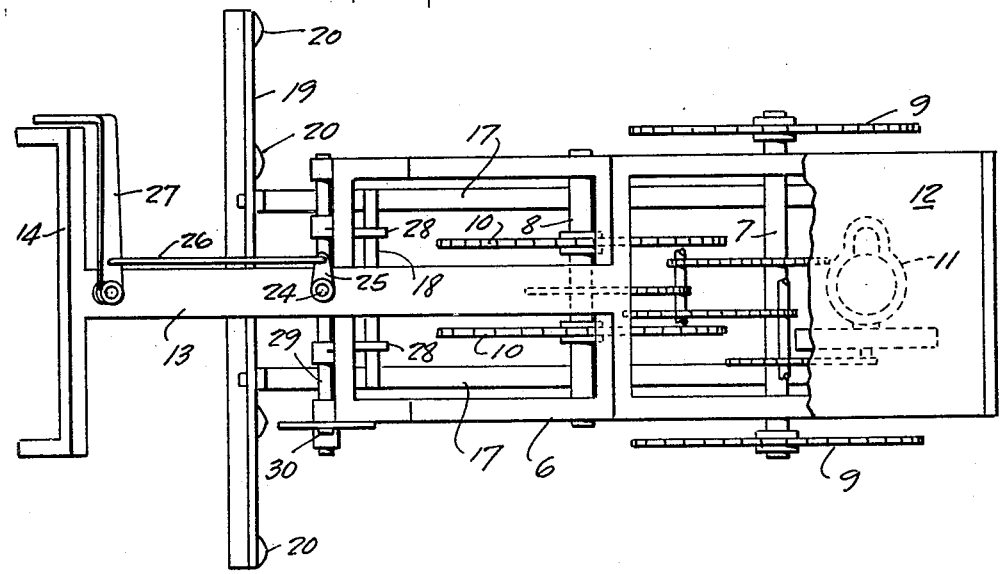
Figure 3:
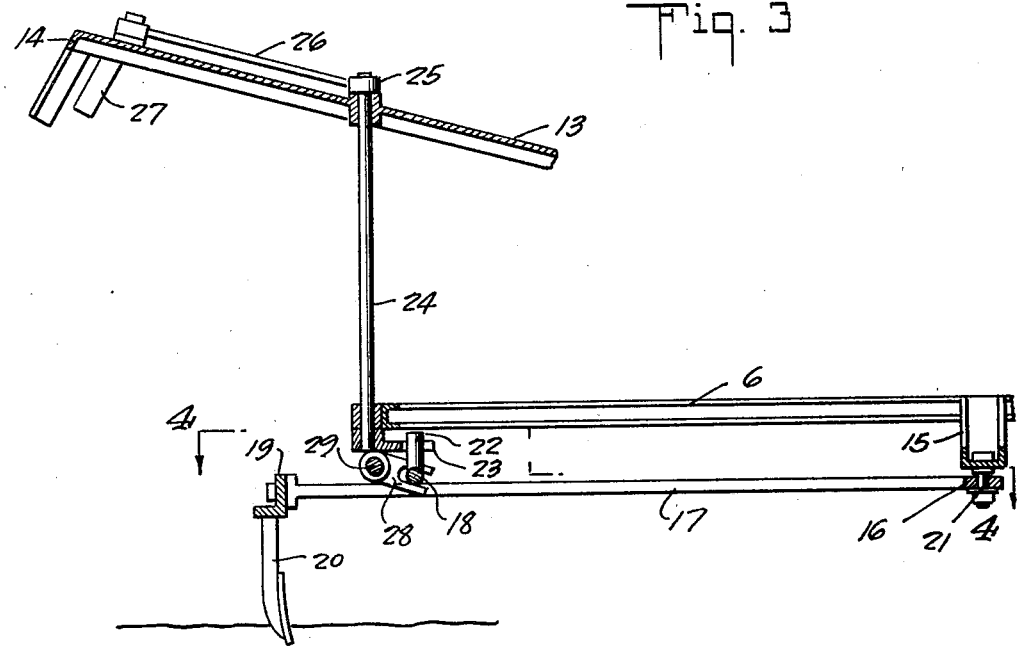
Figure 4:
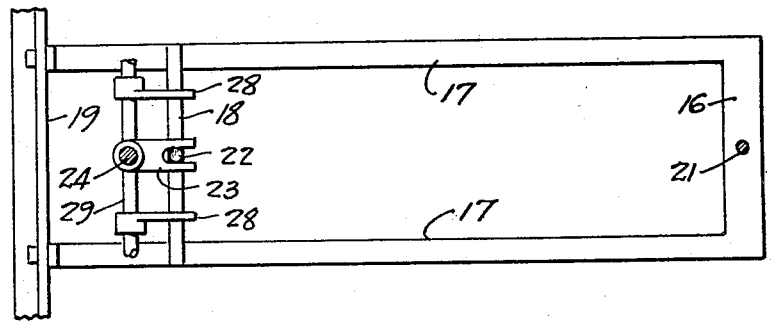

Fig. 1 is a side elevation of a self propelled agricultural implement which finds general application in truck gardening and the working of small plots; Fig. 2 is a plan view; Fig. 3 is a vertical section; and Fig. 4 is a fragmentary view as seen on the section line 4—4 of Fig. 3.

Although there is disclosed herein an agricultural implement adapted to the cultivation of small plots, it will be understood that the invention is not limited to the field of use above mentioned or to machines of a comparatively small size. The invention is shown embodied in a four wheel implement of the close coupled type with a pair of wheels inset with respect to another pair of wheels.

Referring with more particularity to the drawings, a tractor frame 6 having a rectangular base and side portions built up of bars has a front axle 7 and a rear axle 8 journalled in suitable bearing blocks thereon. Axle 7 overhangs the sides of the tractor frame, and fixedly secured to the axle are serrated traction wheels 9. On the axle 8 are serrated traction wheels 10 which are inset with respect to the traction wheels 9. A motor 11 is geared to the axles by suitable chains and sprockets forming no part of the present invention. Any suitable type of gearing to drive the axles may be provided and that shown is for illustrative purposes only. The construction is such that the motor may be housed in by a hood 12 so as to protect it from dust and dirt. Projecting rearwardly and secured to the tractor frame is a guide handle 13 having at the end thereof a hand grip 14 extending transversely. The handle provides means for guiding the tractor. A bracket 15 is secured to the tractor frame adjacent the front axle 7 and serves for means to connect a drawbar frame thereto.

A drawbar frame comprises a yoke 16 and trace bars 17 joined at the rear by a cross-bar or rod 18. At the rear of the trace bars and secured thereto is a hitch bar 19 carrying ground working tools. 20. The drawbar frame is connected to the tractor frame at the bracket 15 by a pin 21 which allows lateral swinging of the drawbar frame, the connection of the pin to the frame being loose to enable a limited up and down swinging movement. The connection is such that a universal swinging movement is permitted. It will be noted that the construction is such that the trace bars 17 are disposed between the adjacent companion traction wheels 9 and 10.

By the construction shown, the drawbar frame will trail, but may wobble from side to side due to irregularities in the ground or hard spots unless restrained. In order to hold the drawbar frame in a selected position or to swing the drawbar frame laterally in order to aid in turning of the implement, position and stabilizing coupling means are provided. Mounted on the cross rod 18 and upstanding therefrom is a pin 22 which is engaged by a bridle link 23. The bridle link is secured to a shaft 24 pivotally mounted at the rear on the tractor frame 6. The shaft 24 extends through a bearing in the handle 13 and has a crank arm 25 fixed thereto. Secured to the crank arm 25 is a connecting rod 26 which is secured at its other end to a lever handle 27 which substantially parallels the hand grip 14. It is obvious that the swinging of the lever handle 27 will cause swinging movement of the bridle link 23 and thereby lateral movement of the drawbar frame in relation to the tractor frame. The handle 27 may be held in any selected position and thus the drawbar frame held in the selected angular position in relation to the tractor frame.

In order to fix the up or down position of the drawbar frame in relation to the tractor frame and thereby the depth of the penetration of the ground working tools I have provided a position coupling means, bridle links 28 which embrace the cross rod 18 and coact therewith. The bridle links 28 are fixed to a shaft 29 and to the end of the shaft is secured a lever or handle 30 so that swinging of the handle will cause swinging of the bridles 28 and thereby raising or lowering of the drawbar frame. In order to hold the drawbar frame in adjusted up or down position, I have provided a conventional type of hold-fast as indicated generally by 31. This hold-fast may consist of a quadrant and catch.

It will be noted that the drawbar frame may be coupled for swinging to the tractor frame adjacent the center of weight. By releasing the grip upon the handle 27, the drawbar frame is free to trail. By positively swinging the handle 27, the drawbar frame may be adjusted as to its angular position and held in the selected position.

What I claim is:—

1. An implement comprising a tractor provided with a normally fixed tractor frame and including a guide handle; a drawbar frame having trace bars connected at the front by a yoke and adapted to have a hitch bar secured to the rear, said yoke having a swinging connection to the front of said tractor frame to enable angular movement of said frames in relation to one another; a position coupling for determining the angular position of said drawbar frame in relation to said tractor frame. said coupling comprising a link mounted on one of said frames for movement thereon and secured to the other frame whereby movement of the link will cause angular movement of said drawbar frame in relation to said tractor frame, and means for actuating said link.

2. An implement comprising a tractor provided with a normally fixed tractor frame and including a guide handle; a drawbar frame having trace bars connected at the front by a yoke and adapted to have a hitch bar secured to the rear, said yoke having a swinging connection to the front of said tractor frame to enable angular movement of said frames in relation to one another; a position coupling for determining the angular position of said drawbar frame in relation to said tractor frame, said coupling comprising a link mounted on one of said frames for movement thereon and secured to the other frame whereby movement of the link will cause angular movement of said drawbar frame in relation to said tractor frame, and means for actuating said link, said means having a manually operable member disposed at said handle.

3. An implement comprising a tractor provided with a normally fixed tractor frame and including a guide handle; a drawbar frame having trace bars connected at the front by a yoke and adapted to have a hitch bar secured to the rear, said yoke having a swinging connection to the front of said tractor frame to enable angular movement of said frames in relation to one another; a position coupling for determining the angular position of said drawbar frame in relation to said tractor frame, said coupling comprising a link mounted on said tractor frame for movement thereon and secured to said drawbar frame whereby movement of the link will cause angular movement of said drawbar frame in relation to said fixed frame.

4. An implement comprising a tractor provided with a normally fixed tractor frame and including a guide handle; a drawbar frame having trace bars connected at the front by a yoke and adapted to have a hitch bar secured to the rear, said yoke having a swinging connection to the front of said tractor frame to enable angular movement of said frames in relation to one another; a position coupling for determining the angular position of said drawbar frame in relation to said tractor frame, said coupling comprising a link mounted on said tractor frame for movement thereon and secured to said drawbar frame whereby movement of the link will cause angular movement of said drawbar frame in relation to said fixed frame, and means for actuating said link, said means having a manually operable control handle disposed at said guide handle.

5. An implement comprising a tractor provided with a normally fixed tractor frame and including a guide handle; a drawbar frame having trace bars connected at the front by a yoke and adapted to have a hitch bar secured to the rear, said yoke having a swinging connection to the front of said tractor frame to enable swinging of said frames in relation to one another; a position coupling for determining the angular position of said drawbar frame in relation to said fixed frame, said coupling comprising a link pivotally mounted on one of said frames and secured to the other frame to enable swinging of the latter whereby movement of the link will cause swinging of said drawbar frame in relation to said tractor frame, and means for actuating said link.

6. An implement comprising a tractor provided with a normally fixed tractor frame and including a guide handle; a drawbar frame having trace bars connected at the front by a yoke and adapted to have a hitch bar secured to the rear, said yoke having a swinging connection to the front of said tractor frame to enable swinging of said frames in relation to one another; a position coupling for determining the angular position of said drawbar frame in relation to said fixed frame, said coupling comprising a link pivotally mounted on one of said frames and secured to the other frame to enable swinging of the latter whereby movement of the link will cause swinging of said drawbar frame in relation to said tractor frame, and means for actuating said link, said means having a manually operable member disposed at said handle.

7. An implement comprising a tractor provided with a normally fixed tractor frame and including a guide handle; a drawbar frame having trace bars connected at the front by a yoke and adapted to have a hitch bar secured to the rear, said yoke having a swinging connection to the front of said tractor frame to enable angular movement of said frames in relation to one another; a position coupling for determining the angular position of said drawbar frame in relation to said tractor frame, said coupling comprising a link pivotally mounted on said tractor frame and secured to said drawbar frame whereby movement of the link will cause swinging of said drawbar frame in relation to said tractor frame, and means for actuating said link, said means having a manually operable control handle disposed at said guide handle.

8. An implement comprising a tractor provided with a normally fixed tractor frame and including a guide handle with a hand bar; a drawbar frame having trace bars connected at the front by a yoke and at the rear by a cross bar and adapted to have a hitch bar secured to the rear, said yoke having a swinging connection to the front of said tractor frame to enable angular movement of said frames in relation to one another; a position coupling for determining the angular position of said drawbar frame in relation to said fixed frame, said coupling comprising a bridle link pivotally mounted on said tractor frame for movement thereon and a pin mounted on said cross bar and disposed in the bridle of said link whereby movement of the link will cause swinging of said drawbar frame in relation to said tractor frame, and means for actuating said link, said means having a manually operable control handle disposed at and parallel to said hand bar for movement to and from the latter.

9. An implement comprising a tractor provided with a normally fixed tractor frame and including a guide handle; a drawbar frame having trace bars connected at the front by a yoke and adapted to have a hitch bar secured to the rear, said yoke having a swinging connection to the front of said tractor frame to enable angular movement of said frames in relation to one another; a position coupling for determining the angular position of said drawbar frame in relation to said tractor frame, said coupling comprising a link mounted on one of said frames for movement thereon and secured to the other frame whereby movement of the link will cause lateral angular movement of said drawbar frame in relation to said tractor frame, and means for actuating and holding said link.

10. An implement comprising a tractor provided with a normally fixed tractor frame and including a guide handle; a drawbar frame having trace bars connected at the front by a yoke and adapted to have a hitch bar secured to the rear, said yoke having a swinging connection to the front of said tractor frame to enable angular movement of said frames in relation to one another; a position coupling for determining the angular position of said drawbar frame in relation to said tractor frame, said coupling comprising a link mounted on one of said frames for movement thereon and secured to the other frame whereby movement of the link will cause lateral angular movement of said drawbar frame in relation to said tractor frame, and means for actuating and holding said link, said means having a manually operable member disposed at said handle.

11. An implement comprising a tractor provided with a normally fixed tractor frame and including a guide handle; a drawbar frame having trace bars connected at the front by a yoke and adapted to have a hitch bar secured to the rear, said yoke having a swinging connection to the front of said tractor frame to enable swinging of said frames laterally in relation to one another; a position coupling for determining the angular position of said drawbar frame in relation to said fixed frame, said coupling comprising a link pivotally mounted on one of said frames and secured to the other frame to enable swinging of the latter whereby movement of the link will cause swinging of said drawbar frame in relation to said tractor frame, and means for actuating and holding said link.

12. An implement comprising a tractor provided with a normally fixed tractor frame and including a guide handle; a drawbar frame having trace bars connected at the front by a yoke and adapted to have a hitch bar secured to the rear, said yoke having a swinging connection to the front of said tractor frame to enable swinging of said frames laterally in relation to one another; a position coupling for determining the angular position of said drawbar frame in relation to said fixed frame, said coupling comprising a link pivotally mounted on one of said frames and secured to the other frame to enable swinging of the latter whereby movement of the link will cause swinging of said drawbar frame in relation to said tractor frame, and means for actuating and holding said link, said means having a manually operable member disposed at said handle.

13. An implement comprising a tractor provided with a normally fixed tractor frame and including a guide handle; a drawbar frame having trace bars connected at the front by a yoke and adapted to have a hitch bar secured to the rear, said yoke having a universal swinging connection to the front of said tractor frame to enable angular movement of said frames in relation to one another; a side swing link mounted on said tractor frame for movement thereon laterally and secured to said drawbar frame whereby movement of the link will cause lateral angular movement of said drawbar frame in relation to said fixed frame, means for actuating and holding said side swing link, an up and down swing link mounted on said tractor frame for up and down movement and secured to said drawbar frame, and means for actuating and holding said up and down swing link, said last mentioned means having a manually operable handle, and position locking means for said last mentioned handle.

14. An implement comprising a tractor provided with a normally fixed tractor frame and including a guide handle; a drawbar frame having trace bars connected at the front by a yoke and adapted to have a hitch bar secured to the rear, said yoke having a universal swinging connection to the front of said tractor frame to enable angular movement of said frames in relation to one another; a side swing link mounted on said tractor frame for movement thereon laterally and secured to said drawbar frame whereby movement of the link will cause lateral angular movement of said drawbar frame in relation to said fixed frame, means for actuating and holding said side swing link, said means having a manually operable control handle disposed at said guide handle, an up and down swing link mounted on said tractor frame for up and down movement and secured to said drawbar frame, and means for actuating and holding said up and down swing link, said last mentioned means having a manually operable handle, and position locking means for said last mentioned handle.

15. An implement comprising a tractor provided with a normally fixed tractor frame and including a guide handle; a drawbar frame having trace bars connected at the front by a yoke and adapted to have a hitch bar secured to the rear, said yoke having a universal swinging connection to the front of said tractor frame to enable angular movement of said frames in relation to one another; a lateral bridle link pivotally mounted on said tractor frame for lateral swinging thereon, a pin mounted on said drawbar frame and disposed in the bridle of said link whereby movement of the lateral link will cause lateral swinging of said drawbar frame in relation to said tractor frame, means for actuating said lateral link, an up and down bridle link mounted on said tractor frame for up and down movement with its bridle embracing said drawbar frame whereby movement of said up and down link will cause up and down movement of said drawbar frame, and means for actuating and holding said up and down link, said last mentioned means having a manually operable handle, and position locking means for said last mentioned handle.

16. An implement comprising a tractor provided with a normally fixed tractor frame and including a guide handle; a drawbar frame having trace bars connected at the front by a yoke and adapted to have a hitch bar secured to the rear, said yoke having a universal swinging connection to the front of said tractor frame to enable angular movement of said frames in relation to one another; a lateral bridle link pivotally mounted on said tractor frame for lateral swinging thereon, a pin mounted on said drawbar frame and disposed in the bridle of said link whereby movement of the lateral link will cause lateral swinging of said drawbar frame in relation to said tractor frame, means for actuating said lateral link, said means having a manually operable control handle disposed at said guide handle, an up and down bridle link mounted on said tractor frame for up and down movement with its bridle embracing said drawbar frame whereby movement of said up and down link will cause up and down movement of said drawbar frame, and means for actuating and holding said up and down link, said last mentioned means having a manually operable handle, and position locking means for said last mentioned handle.

17. An implement comprising a tractor provided with a normally fixed tractor frame and including a guide handle with a hand bar; a drawbar frame having trace bars connected at the front by a yoke and at the rear by a cross bar and adapted to have a hitch bar secured to the rear, said yoke having a universal swinging connection to the front of said tractor frame to enable angular movement of said frames in relation to one another; a lateral bridle link pivotally mounted on said tractor frame for movement laterally thereon and a pin mounted on said cross bar and disposed in the bridle of said link whereby movement of the link will cause swinging of said drawbar frame in relation to said tractor frame, means for actuating and holding said lateral link, an up and down bridle link mounted on said tractor frame for up and down movement, with its bridle embracing said cross bar whereby movement of said up and down link will cause up and down movement of said drawbar frame, a handle for actuating said up and down link, and a hold fast for locking said last mentioned handle in adjusted position.

18. An implement comprising a tractor provided with a normally fixed tractor frame and including a guide handle with a hand bar; a drawbar frame having trace bars connected at the front by a yoke and at the rear by a cross bar and adapted to have a hitch bar secured to the rear, said yoke having a universal swinging connection to the front of said tractor frame to enable angular movement of said frames in relation to one another; a lateral bridle link pivotally mounted on said tractor frame for movement laterally thereon and a pin mounted on said cross bar and disposed in the bridle of said link whereby movement of the link will cause swinging of said drawbar frame in relation to said tractor frame, means for actuating and holding said lateral link, said means having a manually operable control handle disposed at and parallel to said hand bar for movement to and from the latter, an up and down bridle link mounted on said tractor frame for up and down movement with its bridle embracing said cross bar whereby movement of said up and down link will cause up and down movement of said drawbar frame, a handle for actuating said up and down link, and a hold fast for locking said last mentioned handle in adjusted position.

19. An implement comprising a tractor provided with a normally fixed tractor frame and including a guide handle; a drawbar frame adapted to have a hitch bar secured to the rear, and having a swinging connection to the front of said tractor frame to enable angular movement of said frames in relation to one another; a position coupling for determining the angular position of said drawbar frame in relation to said tractor frame, said coupling comprising a link mounted on one of said frames for movement thereon and secured to the other frame whereby movement of the link will cause angular movement of said drawbar frame in relation to said tractor frame, and means for actuating said link.

In witness that I claim the foregoing I have hereunto subscribed my name this 27 day of January, 1931.

HAROLD H. GLASIER.